(12) United States Patent
Ueda

(10) Patent No.: US 8,472,034 B2
(45) Date of Patent: Jun. 25, 2013

(54) JOB CONTROL DEVICE, JOB CONTROL FILE, JOB CONTROL METHOD, AND JOB CONTROL PROGRAM

(75) Inventor: Haruyasu Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1142 days.

(21) Appl. No.: 10/785,952

(22) Filed: Feb. 26, 2004

(65) Prior Publication Data

US 2004/0223176 A1    Nov. 11, 2004

(30) Foreign Application Priority Data

May 7, 2003   (JP) ................................ 2003-129025

(51) Int. Cl.
- *G06F 3/12* (2006.01)
- *G06F 11/00* (2006.01)
- *G06F 13/14* (2006.01)
- *G06F 9/46* (2006.01)

(52) U.S. Cl.
USPC ........... 358/1.1; 358/1.13; 714/100; 345/520; 718/104; 718/105

(58) Field of Classification Search
USPC ............. 358/1.1, 1.13, 1.15, 1.12, 1.14, 1.18, 358/403, 444, 445, 1.16, 1.17, 1.4, 1.6, 468, 358/502, 538; 345/520; 718/104, 105, 101, 718/102, 10; 710/260, 263, 268; 705/8, 206, 705/207, 223, 232, 238
See application file for complete search history.

(56) References Cited

U.S. PATENT DOCUMENTS

| | | | |
|---|---|---|---|
| 6,373,585 B1 * | 4/2002 | Mastie et al. | 358/1.15 |
| 6,467,045 B2 * | 10/2002 | Takeda | 714/5.1 |
| 7,016,061 B1 * | 3/2006 | Hewitt | 358/1.15 |
| 7,127,715 B2 * | 10/2006 | Inui | 718/105 |
| 7,143,157 B2 * | 11/2006 | Henry | 709/223 |
| 7,202,964 B2 * | 4/2007 | Christiansen | 358/1.15 |

FOREIGN PATENT DOCUMENTS

| | | |
|---|---|---|
| EP | 1387267 A1 * | 2/2004 |
| JP | 08-272626 | 10/1996 |
| JP | 8-272626 | 10/1996 |
| JP | 2002-73576 | 3/2002 |
| JP | 2002-073576 | 3/2002 |

OTHER PUBLICATIONS

Platform Computing—Products—Platform Symphony; Accelerating Intelligence; http://www.platform.com/products/Symphony ; Feb. 26, 2004.
PBS Pro Home; The Trusted Solution for Workload Management; http://www.openpbs.com; Feb. 26, 2004.
Condor Project Homepage; Condor High Throughput Computing; http://www.cs.wisc.edu/condor ; Feb. 26, 2004.
Japanese Office Action mailed on Oct. 2, 2007 in corresponding Japanese Patent Application 2003-129025 (3 pages translation).

* cited by examiner

*Primary Examiner* — Houshang Safaipour
*Assistant Examiner* — Neil R McLean
(74) *Attorney, Agent, or Firm* — Staas & Halsey LLP

(57) ABSTRACT

When batch jobs are submitted, the names of the jobs can be arbitrarily designated, so that a user can prepare a configuration file in an easy manner, and the time and effort of the management thereof can be alleviated. Upon submitting batch jobs, a configuration file reading part (1) reads in a control file (F) in which job names arbitrarily designated by the user are described, and a processing execution part, which is constituted by a job state handling part 6, an execution-content executing part (4) and a job submitting part (5), determines the sequence of the respective jobs according to the job names by making reference to a job state database (2), submits necessary jobs at appropriate timing, and thereafter monitor the states of the jobs thus submitting.

12 Claims, 8 Drawing Sheets

FIG. 2(A)

```
do_job NAME     FILE CONTAINING JOB CONTENT
```

FIG. 2(B)

```
do_job NAME {
    BINARY NAME 1    PARAMETER NAME 1
    BINARY NAME 2    PARAMETER NAME 2
}
```

FIG. 2(C)

```
when NAME  NAME  NAME ... {
    do_job NAME    JOB CONTENT
}
```

FIG. 2(D)

```
for SENTENCE
while SENTENCE
if SENTENCE
    do_job NAME    JOB CONTENT
```

FIG. 2(E)

```
when NAME1  NAME2  NAME3 ... {
    if (NAME1 == "DESIRED JOB"){
    do_job NAME    JOB CONTENT
    }
}
```

FIG.3(A)

RESULT OF READING OF CONFIGURATION FILE

| EXECUTION CONTENT | | |
|---|---|---|
| JOB NAME | JOB CONTENT | |
| JOB NAME | JOB CONTENT | |

FIG.3(C)

| EXECUTION CONTENT | |
|---|---|
| PROGRAM CHARACTERS SEQUENCES | |
| JOB SUBMITTING INSTRUCTION: | |
| JOB NAME | JOB CONTENT |

FIG.3(B)

| EXECUTION CONTENT | |
|---|---|
| (LIST, PATTERN OF) WAITING JOB NAME | EXECUTION CONTENT (JOB LIST OR PROGRAM) |
| (LIST, PATTERN OF) WAITING JOB NAME | EXECUTION CONTENT (JOB LIST OR PROGRAM) |

FIG. 7

```
when {{ {{JOB NAME PATTERN}} ... }}{{
    LOCAL SCRIPT
}}
```

FIG. 8

```
do_job {{ JOB NAME }}{{
    JOB SCRIPT
}}
```

FIG. 9

```
KEY = VALUE    KEY = VALUE
```

JOB CONTROL DEVICE, JOB CONTROL FILE, JOB CONTROL METHOD, AND JOB CONTROL PROGRAM

BACKGROUND OF THE INVENTION

1. Field of the Invention

The present invention relates to a job control device which is provided with a control configuration file reading part for reading a control configuration file, and controls submitting jobs to a job submit system based on the descriptive content of the control configuration file read in by the control configuration file reading part, and it also relates to such a control configuration file, a job control method and a job control program, which have been developed in particular for the purpose of reducing the time and effort of user's management when a batch of jobs are submitted.

2. Description of the Related Art

A conceptual diagram of a known job control device to which jobs are submitted is shown in FIG. 10. In this known device, a user submits jobs to a queue of the device while accompanying a script or a description file to submit the jobs, and job IDs are then returned to the user. The user confirms or ascertains the end or completion of each job by the use of e-mail, etc., or ascertains the situation of job processing while designating job IDs. After the end of the job, the result is taken out of the file. As such a batch job system, there have been known LSF of Platform Computing Inc., OpenPBS, Condor of the High Throughput Computing Team of University of Wisconsin, etc.

In any of the above-mentioned systems, a user can designate an option to receive an e-mail as the end or completion of one job each time the job has been ended or completed, so that he or she can confirm or ascertain the completion of the job. However, only a very small number of systems permit a user to confirm the completion or end of each job after all the plurality of jobs have been completed.

Although a plurality of jobs can be submitted from one job control file in the above-mentioned "Condor", what can be designated are only the names of programs to be executed and their parameters. In cases where the programs to be executed are written in sh script or in perl script, it is necessary to manage a script file and a job control file, separately. Besides, the method of notifying when all the groups of jobs submitting at a time have been completed can only send an e-mail, but it is impossible to actuate or boot a general program or to write data or the like into a file.

In the systems other than the "Condor", only a single job can be submitted at a time, and hence in order to submit a lot of jobs mechanically or in an automatic fashion, it is necessary to prepare a plurality of separate programs such as, for example, sh scripts, perl scripts or the like individually, from which the jobs can be submitted. As a result, there is a need to manage the scripts for submitting the jobs and the scripts for performing the jobs, separately. Moreover, it is necessary to correct the scripts for submitting the jobs upon submit of each job, and mistakes can be easily made. Even with the "Condor", the sequence of jobs capable of being submitted can only be described, and when it is desired to submit similar jobs repeatedly, a complicated procedure is required in which each job has to be submitted after a job control file has been created automatically by a separate program.

Further, there have also been provided some methods of executing jobs while awaiting the completion of other jobs. For example, in "PBS", such a procedure is taken in which after all jobs have once been submitted, the context or sequence of the jobs is separately designated by a command or commands with respect to job IDs that are obtained at the time of submitting the jobs. Since in this method, however, the job IDs can not be known until the jobs are submitted, a procedure is required in which after those jobs which are executed later are once submitted in an execution-hold state, the context or sequence thereof is first designated by using their IDs, and the hold state is then released. Thus, such a procedure is very complicated and fussy.

Furthermore, in the "Condor", the sequence of execution between the jobs can be designated as a DAG (Directed Acyclic Graph), but this designation is described in a separate file in a format independent from the ordinary job control file, and it is executed by using a group of different commands. That is, if the file for the "DAG" and the job control file are both executed by scripts, it is necessary to manage three kinds of script files in mutually different formats at the same time. In addition, what can be described as a context or sequence is limited to jobs, even a simple work such as accumulation or tabulation of files or the like, requiring a very short execution time, has to be submitted as a job, so it needs to wait in a queue for a machine to become available.

In the past, the number of jobs to be submitted at a time is relatively small, e.g., from a few to tens, it is easy for a user to wait for being informed of the completion of the jobs by means of e-mail or the like. Additionally, if it becomes necessary to submit a job after a certain job has been completed, the user must submit that job at such a time by manual operation. However, at present, a lot of computers are connected to one another through networks by the use of a GRID technology or the like, so hundreds of computers become available. As a result, the number of jobs submitting by a user at a time also becomes huge, e.g., from hundreds to thousands. In this case, it is necessary to prepare scripts for submitting jobs or control files by manual operation or by executing a program separately, and hence there arises a problem in that much time and effort are required for the management thereof, and there easily take place various errors.

Still further, when the number of jobs submit by a user at a time becomes huge such as hundreds or thousands or more, there arises another problem in that even if the completion of each job is informed by an e-mail, the user can not properly perform the management thereof because of too many number of e-mails.

In addition, when jobs are executed by the use a lot of computers, they are executed concurrently and in parallel by means of the computers mutually connected to one another, so the jobs will be completed in random order. Thus, there arises the following problem. That is, when another work is performed after groups of necessary jobs have been completed, i.e., when the results of groups of jobs are arranged, collected or coordinated, or when another work is done while utilizing the job results, it is difficult to automatically check whether all the really necessary jobs have been completed, so it becomes necessary to carry out manual check at regular intervals, which is very time consuming.

Moreover, there is a problem in that it is also difficult to make another work performed automatically at the end of certain jobs. Further, when the number of jobs to be waited for is irregular or variable, i.e., when the number of jobs to be awaited is changed according to the submitting of a job or jobs, there arises an additional problem in that it is very difficult to describe the waiting of jobs in an appropriate manner. Also, there might be a case where a user wants to determine whether to submit another job or jobs based on data that are output by the jobs of concern. For example, various jobs are tried so that the result output thereby provides an optimal value or values. However, in such a case, there is the following problem. That is, it is difficult to determine, by executing a suitable program after the completion of jobs is awaited, whether the result obtained by each try provides an optimal value or values, and to further submit a job or jobs as a result of such determination.

Furthermore, when a user wants to wait for jobs, he or she sometimes wants to wait for a plurality of groups of jobs which are very similar to one another. For example, in cases where there are a plurality of works in which a first one must be done while waiting for all the jobs whose parameter A is 1, a second one must be done while waiting for all the jobs whose parameter A is 2, ... , and the last one must be done while waiting for all the jobs whose parameter A is 10, there is a problem in that describing respective waitings for all the works ten times is most troublesome.

Still further, there is a case where it is desired to redo only part of a large amount of submitting jobs. For example, only a set of mutually related jobs among them are to be submitted while correcting part of an submitting file. In such a case, in the past, it is necessary to submit only the necessary jobs manually, but if the number of jobs to be submitted increases too much, it is difficult to submit them by manual operation, and hence the jobs should be submitted through a separate script or the like. In this case, however, it is problematic that preparing, updating and managing such a script in each time is troublesome.

Besides, it might take a very long time to complete jobs, and in this case, the software of this patent must be kept executed all the time during execution of the jobs, as a result of which the danger of abnormal termination of the software due to some causes such as hardware trouble or the like increases. In such a case, there is a problem that the effectiveness of the software of this patent is greatly impaired if there is no method of continuing the waiting.

Additionally, in part of job submitting mechanisms such as "PBS", there is a problem in that once a job has been completed, information on the start and end of the job might not be issued, so it is impossible to know the time point at which the execution of the job is started or completed.

SUMMARY OF THE INVENTION

Accordingly, the present invention is intended to obviate a variety of problems as referred to above, and has its object to reduce the time and effort of user's management when a batch of jobs are submitted. In addition, the present invention aims to automatically prepare scripts and control files necessary for submitting jobs, and also to decrease the time required for executing the jobs by preventing duplicate jobs from being submitted. The present invention also aims to enable only part of jobs to be selectively reexecuted by making a setting in a manner as if they had not yet been executed, without changing control files.

In order to solve the above-mentioned problems, according to one aspect of the present invention, there is provided a job control device which is provided with a configuration file reading part for reading a configuration file, and controls submitting jobs to a job submitting system based on a descriptive content of the configuration file read in by the configuration file reading part, the device comprising: a job designation description reading part that reads a job designation description which is described in the configuration file and which is able to arbitrarily designate jobs; a processing execution part that performs prescribed processing to submit the jobs designated by the job designation description read by the job designation description reading part; and a job management part that manages the states of the jobs designated by the job designation description read by the job designation description reading part.

According to such a construction, a user can perform job submitting processing by arbitrarily designating jobs. As a result, it becomes easy to prepare the control configuration file for submitting jobs, and the degree of freedom in the preparation of such a file also becomes high, thus making it possible to reduce the user's load at the time of submitting jobs. In one embodiment, the processing execution part is constituted by a job state handling part 6, an execution-content executing part 4 and a job submitting part 5. However, the processing execution part may perform processing in such a manner that the timing at which a job is submitted is determined based on the result of management according to the job management part, and the result of such a determination is output to the outside.

Preferably, in the job control device of the present invention, the job designation description reading part reads the job designation description described in relation to a program which should be executed and is described in the configuration file read by the configuration file reading part.

According to such a construction, repetition control such as "for" sentences, "while" sentences, etc., can be used, and the submitting of jobs can be done in these sentences. Accordingly, it is possible to submit a large amount of jobs merely by making a very short description in the control configuration file. In general, a program is able to describe determination, repetition, calls of subprograms, etc. As a result, it is possible to perform complicated work such as, for example, taking out of the results of jobs, the submitting of jobs based on the results of other jobs, processing through repetition of results of an indefinite number of jobs. Accordingly, it is possible to perform processing of jobs while waiting for an indefinite number of other jobs or to submit jobs based on the results of other jobs, thus making it possible to provide a large degree of freedom for job submitting processing.

Preferably, in the job control device of the present invention, when a job submitting condition for a prescribed job designated by the job designation description is described in the configuration file in relation to other jobs designated and described therein, the processing execution part determines, based on the result of management of the management part according to a job designation description of the other jobs, whether the job submitting condition is satisfied, and performs prescribed processing necessary for the job submitting based on the result of such a determination.

According to such a construction, when the job submitting condition is satisfied, jobs can be submitted automatically. Therefore, for example, a job can be submitted subject to the completion of other jobs, so it is possible to easily submit even a job having a dependency on other jobs. In one embodiment, the job submitting condition is determined or judged in the job submitting part that constitutes the processing execution part, but it may be determined in either of the job state database management part, the job state handling part and the execution-content executing part.

Preferably, in the job control device of the present invention, the job submitting condition can be a condition that one or more jobs designated and described in the configuration file have been completed, and the processing execution part sets the one or more jobs as jobs to be awaited, and determines whether the one or more jobs to be awaited have been completed.

According to such a construction, since a job can be submitted subject to the completion of other jobs, it is possible to easily submit even a job having a dependency on other jobs.

In this case, the other jobs may be one or more jobs, and the submitting of a job which depends upon a large amount of jobs can automatically be performed.

Preferably, in the job control device of the present invention, the job designation description includes either of job names, a list of job names, pattern designations of jobs, and parameter designations of jobs.

According to such a construction, even a large amount of jobs can be submitted by the use of the single control configuration file, so the processing of such jobs becomes easy, thus making it possible to process a large amount of jobs at an increased speed with improved ease.

Preferably, in the job control device of the present invention, when a job designation is indicated by using parameters in the job designation description, the processing execution part prepares a replacement list which represents the job designation by replacement of each parameter.

According to such a configuration, it is possible to turn the job designation of parameter representation into a concrete or materialized designation, and hence it becomes easy to specify the respective jobs designated by parameters inside a computer, thereby facilitating the processing.

Preferably, in the job control device of the present invention, the configuration file reading part reads a job model described in the configuration file, and the processing execution part performs processing for submitting the jobs based on the job model.

According to such a construction, the description of the control configuration file becomes easy, and the designation of a large amount of jobs can also be made easily.

Preferably, in the job control device of the present invention, the processing execution part prepares a job script file based on the job model described in the configuration file, so that it submits jobs to the job submitting system according to the job script file.

According to such a construction, it is possible to create a file necessary for the job submitting based on the description of the control configuration file by the use of the model in an automatic fashion. As a consequence, it becomes easy to describe the control configuration file, and it is possible to easily designate a large amount of jobs.

Preferably, in the job control device of the present invention, the processing execution part adds a command for writing information on a start or an end of execution of each job to the job script file.

According to such a construction, even in case where the job submitting mechanism does not issue information on the start and/or the end of the execution of a job, it is possible to grasp the state of the start and/or the end of the job. In addition, it is also possible to wait for the completion of all the jobs. As a result, a determination as to whether all the jobs submitting by the use of the job control device can be easily made.

Preferably, in the job control device of the present invention, the job designation description includes a description that designates jobs and indicates a start or end of each of the jobs.

According to such a construction, contents which are executed without fail at the start and/or end of a job can be described. For instance, the processing performed without fail upon completion of a job can be described. For example, processing such as writing a specific value in a specific file, sending an e-mail to a specific address or the like can be done. Thus, according to the present invention, when all the jobs submitting with the use of this software are completed, a suitable operation can be instructed.

Preferably, in the job control device of the present invention, the job management part manages the submitting, start, and completion of each job by referring to the states of jobs written in a database.

According to such a construction, the history of job submitting processing can be retained or held as long as the data in the database is not deleted or erased.

Preferably, in the job control device of the present invention, the job designation description, job IDs and the states of jobs are stored in a database, and the job management part registers new jobs, retrieves jobs, removes jobs, and change the states of jobs.

According to such a construction, management data of a variety of submitting processing operations can be retained or held in the database.

Preferably, in the job control device of the present invention, when a prescribed job to be submitted waits for the completion of other jobs, the job management part stores a list of the other jobs of concern in a database by using the job designation description.

According to such a construction, when a job is to be submitted while waiting for the completion of other jobs, a list of the other jobs of concern is managed.

Preferably, in the job control device of the present invention, when a prescribed job has other jobs which are to be submitted while waiting for the completion of that job, the job management part stores a list of the other jobs of concern in a database by using the job designation description.

According to such a construction, when there are other jobs which are to be submitted while waiting for the completion of a job, a list of the other jobs of concern is managed.

Preferably, in the job control device of the present invention, when a prescribed job is removed from a database, the job management part removes the prescribed job and those jobs which are to be submitted while waiting for the completion of the prescribed job.

According to such a construction, when a certain job is removed, those jobs which depend on that job can automatically be removed.

Preferably, in the job control device of the present invention, in a prescribed case, for a job which is determined not to be completed by the job management part, the configuration file is read in again, and when that job depends on the results of other jobs, the processing execution part determines, based on the result of management acquired from the job management part, whether that job is submitted, and performs the prescribed processing of that job based on the determination result.

According to such a construction, as the prescribed case, for example, when the job control device has terminated abnormally, or when the job control device has been reexecuted after its normal termination, it is not necessary to resubmit jobs which have once been submitted in case where the job management part preserves or saves its management data in a database or the like. This is because the result of management of the jobs is preserved. Moreover, since the processing execution part acquires the management result from the job management part, the dependence of the waiting data or the like can be maintained and reconstructed at the state thereof before the termination of the job control device. Accordingly, the states of the jobs before the termination of the device is continued, thus making it possible to reoperate the device in an efficient manner.

According to another aspect of the present invention, there is provided a job control device which is provided with a configuration file reading part for reading a configuration file, and controls submitting jobs to a job submitting system based on a descriptive content of the configuration file read in by the configuration file reading part, the job control device comprising: a job designation description reading part that reads a job designation description which is described in the configuration file and which is able to arbitrarily designate jobs; a job management part that manages the states of the jobs designated by the job designation description read by the job designation description reading part; and a condition determination part that, in order to submit the jobs designated by the job designation description read by the job designation description reading part, acquires from the job management part the condition of other jobs upon which the jobs of concern depend, and determines whether the dependence of the jobs of concern with respect to the other jobs is satisfied.

According to such a construction, in the control of the job submitting processing, the timings of submitting jobs can automatically be instructed. This is to refer only to the fact that the above-mentioned processing execution part makes the condition determination. Therefore, the result of the determination may of course be used in the job control device, or the determination result may be output to the outside so that it can be used for the job submitting processing of an external device.

Preferably, in the job control device of the present invention, the job management part is able to rewrite or delete the states of jobs written in the database, and the processing execution part reads in the configuration file again for deleted jobs, and executes the prescribed processing or processing which is based on the result of management of the job management part.

According to such a construction, when the job control device is executed again after certain jobs have been removed with respect to the database management part, the jobs not removed can be found by referring to the job state database. Therefore, it is unnecessary to submit the jobs not removed again, but the jobs removed can not be found and have to be submitted again. In other words, only the removed jobs can be executed again. In the above-mentioned operations, the user has only to remove jobs to be redo by designating their job names, but need not edit any file. As a consequence, it is possible to reexecute only a part of jobs without editing any file. Here, note that by automatically removing all the jobs that have the mutual waiting relation with respect to one another, such as waiting jobs that are executed while waiting for some of the removed jobs, other jobs that are executed while further waiting for the waiting jobs, etc., in consideration of the job waiting relation, it is possible to reexecute only a part of jobs and their related jobs without editing any file.

According to a further aspect of the present invention, there is provided a configuration file which can be read by a job control device, the configuration file comprising: a job designation description part that is able to arbitrarily designate jobs; and a content description part that describes the contents of jobs which are described and designated in the job designation description part.

Accordingly, it is possible to provide a control configuration file in which the user can perform the job submitting processing by arbitrarily designating jobs.

According to a still further aspect of the present invention, there is provided a job control method which reads a configuration file, and controls submitting jobs to a job submitting system based on the descriptive content of the configuration file thus read, the job control method comprising: a reading step for reading the configuration file and a job designation description that is able to arbitrarily designate jobs described by a user in the configuration file; an execution step for executing prescribed processing based on the job designation description read in the reading step; and a management step for managing the states of jobs executed by the execution step by using the job designation description.

Preferably, in the job control method of the present invention, when a job submitting condition for prescribed jobs designated by the job designation description is described in the configuration file in relation to other jobs designated and described therein, the execution step includes a condition determination step for acquiring the result of management according to the job management step and determining, based on the management result, whether the job submitting condition is satisfied, wherein the processing execution step performs prescribed processing necessary for submitting jobs based on the determination result according to the condition determination step.

According to a yet further aspect of the present invention, there is provided a job control method which reads a configuration file, and controls submitting jobs to a job submitting system based on the descriptive content of the configuration file thus read, the job control method comprising: a reading step for reading a job designation description which is described in the configuration file and which is able to arbitrarily designate jobs; a job management step for managing the states of the jobs designated by the job designation description read in the reading step; and a condition determination step that, in order to submit the jobs designated by the job designation description read in the reading step, acquires from the management result according to the job management step the condition of other jobs upon which the jobs of concern depend, and determines whether the dependence of the jobs of concern with respect to the other jobs is satisfied.

According to a further aspect of the present invention, there is provided a job control program which makes a computer read a configuration file, and control submitting jobs to a job submitting system based on the descriptive content of the configuration file thus read, the job control program adapted to make the computer execute the steps comprising: a reading step for reading the configuration file and a job designation description that is able to arbitrarily designate jobs described by a user in the configuration file; an execution step for executing prescribed processing based on the job designation description read in the reading step; and a management step for managing the states of jobs executed by the execution step by using the job designation description.

Preferably, in the job control program of the present invention, when a job submitting condition for prescribed jobs designated by the job designation description is described in the configuration file in relation to other jobs designated and described therein, the execution step includes a condition determination step for acquiring the result of management according to the job management step and determining, based on the management result, whether the job submitting condition is satisfied, wherein the processing execution step performs prescribed processing necessary for submitting jobs based on the determination result according to the condition determination step.

According to a further aspect of the present invention, there is provided a job control program which makes a computer read a configuration file, and control submitting jobs to a job submitting system based on the descriptive content of the configuration file thus read, the job control program adapted to make the computer perform the steps comprising: a reading step for reading a job designation description which is described in the configuration file and which is able to arbitrarily designate jobs; a job management step for managing the states of the jobs designated by the job designation description read in the reading step; and a condition determination step that, in order to submit the jobs designated by the job designation description read in the reading step, acquires from the management result according to the job management step the condition of other jobs upon which the jobs of concern depend, and determines whether the dependence of the jobs of concern with respect to the other jobs is satisfied.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIGS. 2(A)-2(E) are views showing the descriptions of a control configuration file according to the first embodiment of the present invention.

FIGS. 3(A)-3(C) are views showing the results of reading the control configuration file.

FIG. 7 is a view showing one example of a syntax of a control configuration file according to the second embodiment of the present invention.

FIG. 8 is a view showing one example of a syntax in a job submitting designation part in a local script.

FIG. 9 is a view showing one example of a syntax of a job name in a job script.

DESCRIPTION OF THE PREFERRED EMBODIMENTS

Now, preferred embodiments of the present invention will be described below in detail while referring to the accompanying drawings.

Embodiment 1

Figure 1:
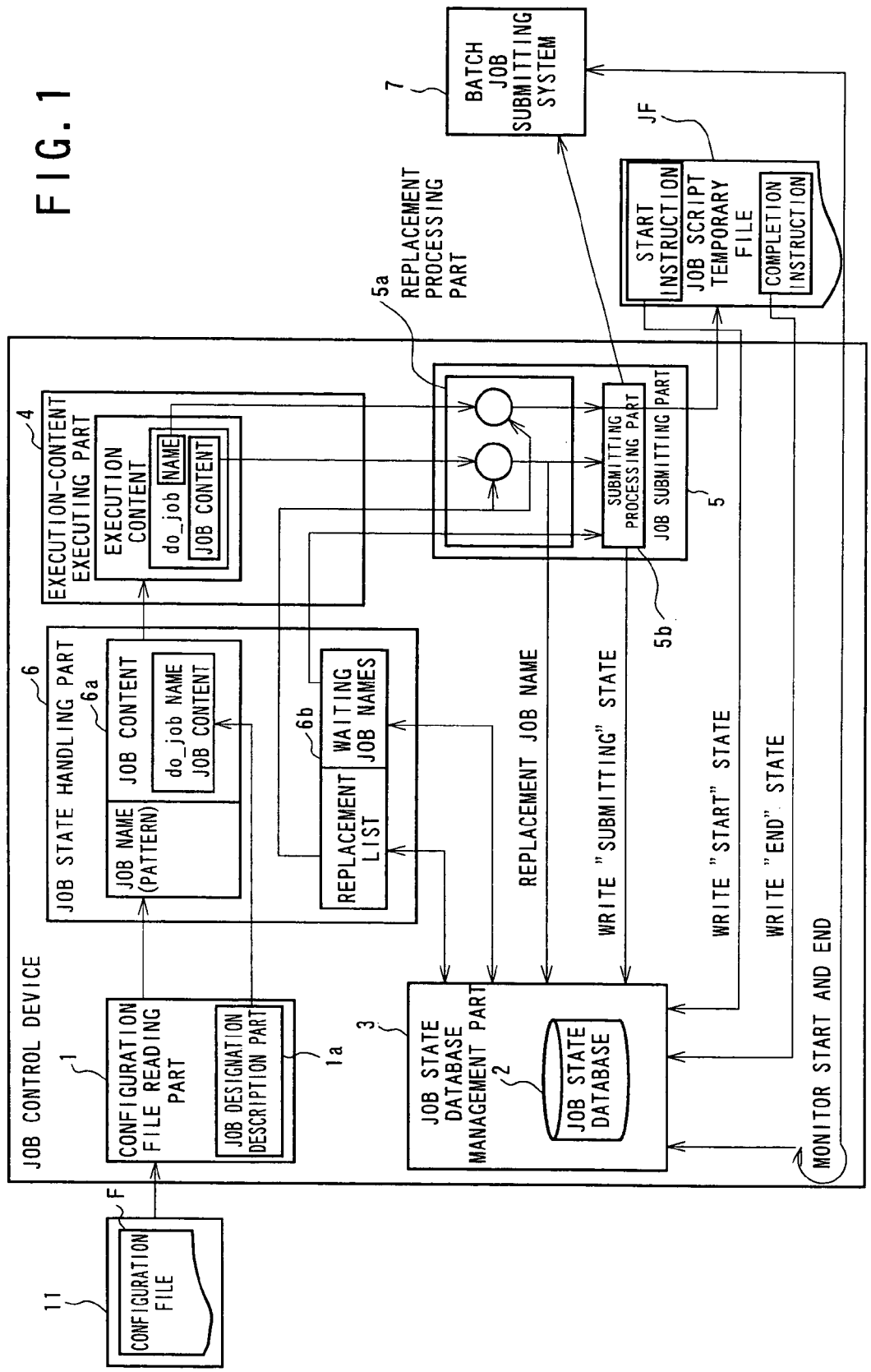
FIG. 1 is a block diagram showing a job control device according to a first embodiment of the present invention.
Figure 4:
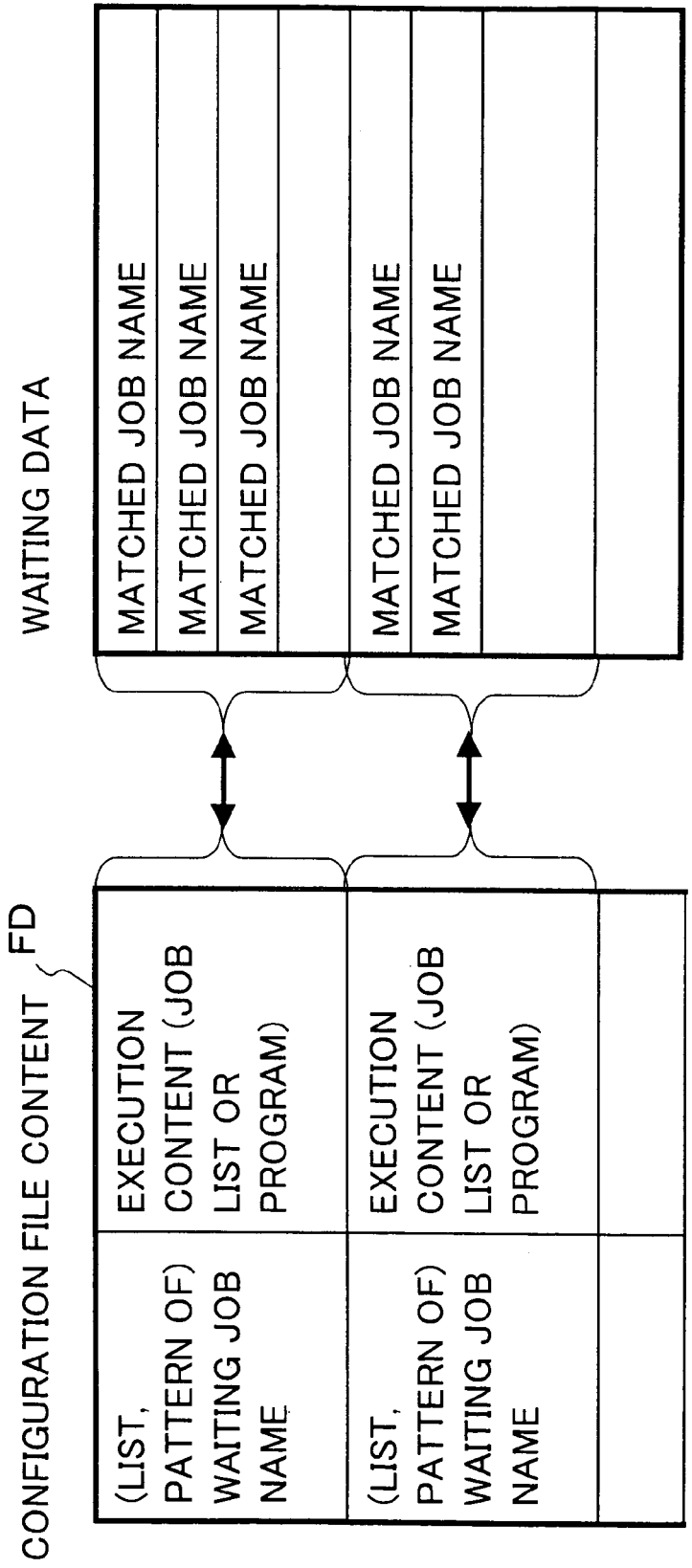
FIG. 4 is a view showing waiting data in case where variables cannot be described in waiting jobs.

FIG. 1 is a block diagram that shows a job control device according to a first embodiment of the present invention. The job control device in the first embodiment serves to read a control configuration file (hereinafter referred to simply as a configuration file), and perform control so as to submit jobs to a batch job system (batch job submitting system 7; hereinafter referred to simply as a job submitting system) based on the descriptive content of the configuration file. The job control device includes a control configuration file reading part (hereinafter referred to simply as a configuration file reading part) 1, a job state database management part 3 having a job state database 2, an execution-content executing part 4, a job submitting part 5, and a job state handling part 6. In the above construction, the execution-content executing part 4, the job submitting part 5 and the job state handling part 6 together constitute a processing execution part of the present invention. Here, note that the job state database 2 may be an external database arranged outside of this job control device.

The configuration file used for this job control device describes the name of each job to be submitted (job designation description) and the content to be executed by the job, along with a relation therebetween. Such a relation is described in the configuration file as shown in FIG. 2(A).

Here, the name of each job is used as a job designation description, by which a user is able to designate an arbitrary job.

The jobs to be submitted can be described in this configuration file in the form of a model. For example, the contents of jobs to be submitted can be described as shown in FIG. 2(B).

Hereinafter, it is assumed that the term "the contents of jobs" in this description generally includes those which are described directly in the configuration file and those which refer to other files, etc.

Further, in this embodiment, a list comprising the kinds of jobs to be awaited and jobs to be submitted at that time can be described in the configuration file together with the job names and the models of job scripts. For example, in order to describe a job to be awaited, a configuration file is described as shown in FIG. 2(C).

Moreover, a configuration file can be organized, instead of describing rows of the names of jobs to be executed and the contents of the jobs as described above and shown in FIG. 2(A) through FIG. 2(C), in such a manner that a program is first described, with the submitting of a job being directed by designating the name of the job in the program, as shown in FIG. 2(D). Alternatively, as shown in FIG. 2(E), after all the jobs to be awaited have been completed, a program in the form of the content to be executed is described in such a manner that a job can be submitted by designating that job by the name thereof in the program. In these configurations, the kinds of jobs to be awaited and a program to be executed at that time are described in a configuration file, and the name of a job to be submitted and a model or template of a script of the job are described in the program.

Now, reference will be made to respective components of the job control device.

(The Configuration File Reading Part)

The configuration file reading part 1 reads a configuration file F submitted from a configuration file submitting part 11, and holds the names of jobs to be executed, and the contents of the jobs as a control file content. The configuration file reading part 1 can hold a list comprising the name and the content to be executed in pair of each job as the execution content of the configuration file, as shown in FIG. 3(A). The job names are created by a job designation description in which a user can arbitrarily designate jobs, and they are read by a job designation description reading part 1a so that the names of jobs are distinguished from the contents of jobs.

In addition, as shown in FIG. 3(B), a list comprising the names of jobs to be awaited (job name list or job pattern list) and the contents to be executed (execution contents) of the jobs in pair can be held as a waiting list of the configuration file content, too.

Furthermore, as shown in FIG. 3(C), the execution content is or is not a program as the case may be, and if it is not a program, the execution content is a list comprising job names and job execution contents in pair.

(The Job Input Part)

The job submitting part 5 submits jobs by making use of a script designated in the configuration file F, or a file containing the contents of jobs, or by using the contents of jobs to be submitted written in the configuration file.

The job submitting part 5 comprises a replacement processing part 5a for individually specifying job names through a replacement list when the job names are designated by variables such as parameters or the like, and an submitting processing part 5b for preparing a job script temporary file JF for the jobs to be submitted. The job submitting part 5 receives the list of the names and the contents of the jobs to be submitted, as well as, if necessary, the replacement list and a list of the names of other jobs the completions of which are awaited. The job name list of the other jobs the completion of which are awaited is passed to the job submitting part 5 only when the submitting of jobs is performed depending upon the other jobs.

The operation of the job submitting part 5 will be described below.

(Step 1): If there is a replacement list, a job to be submitted is replaced with the name of the job through the use of the replacement list.
(Step 2): The job state database is then searched by the name of the job thus replaced.
(Step 3): If there exist a job of the same name searched in the job state database, the retrieval processing is ended without doing anything.
(Step 4): If there does not exist any job of the same name searched in the job state database, the following operation is carried out.
(Step 5): if there is a replacement list, the job for which the search failed is replaced with the content of the job in the replacement list, which is then saved in a temporary file.
(Step 5.1): When the content of the job refer to another file, it is replaced with a corresponding content in that file, which is then saved in another temporary file.
(Step 5.2): When the execution content of the job is written in the configuration file, the job is replaced with the execution content, which is then saved in a temporary file.
(Step 6): If there exists no replacement list, the content of the job is copied into a temporary file.
(Step 7): If a job submitting system 7 is constructed such that it does not return the start and end time points of the execution of the job to the job control device or the job state database 2, an instruction for first writing a start state into the job state database and finally writing an end state into the job state database is added, as part of the execution content of the job, to the temporary file in which the content of the job has been written.
(Step 8): The Job is submitted to the job submitting system by using the saved temporary file.
(Step 9): An ID returned from the job submitting system 7 at the time of submitting the job, and the fact that the name and the state of the job indicate the submitting of the job are registered in the job state database. Here, note that if this job waits for other jobs, upon which the execution of this job depends, at the submitting of this job, a list of the names of the jobs being awaited is registered.

(The Job State Database and the Job State Database Management Part)

The job state database 2 stores and holds items including job names, job IDs, and job states. Here, note that the job states include three states, i.e., "job submitting", "start" and "completion". The job state database management part 3 can perform the following operation by using the job state database 2.

(1) New jobs are freshly registered in the job state database 2.
(2) Jobs are retrieved by the names of the jobs, and the result of this retrieval is taken out.
(3) All the jobs in the job state database 2 are retrieved, and the result of the retrieval is taken out.
(4) Jobs are removed from the job state database 2 by designating the names of the jobs.
(5) The states of jobs are changed by designating the names of the jobs.

Any of these operations can be carried out by obvious or known methods, and hence no particular mention thereof is made here. However, note that when specific jobs are removed as stated in (4) above, in order to remove all the jobs being awaited for execution of the specific jobs, data indicating those jobs having a waiting relation with the specific jobs can be held. Moreover, expansion is made to the operation of freshly registering new jobs, as well as the operation of removing jobs from the job state database by designating the names of the jobs. There are two methods for expanding the held content, either of which can provide the same effects.

<First Holding Method>

The hold content in a first holding method is a list of (1) job names, (2) job IDs, (3) job states, and (4) waiting job names.

In this first holding method, when jobs are freshly registered, a list of given job names, job IDs, job states and waiting job names is registered as it is. In addition, when jobs are removed by designating the names of the jobs, the first holding method is carried out as follows.

(Step 1): The database is searched by the job names to remove the jobs.
(Step 2): The names of jobs meeting the following condition are taken out among all the jobs held in the database.
(Step 2.1): There are the names of the jobs which are instructed to be removed in the list of waiting jobs.
(Step 3): For all the names of jobs meeting the above condition, an operation is carried out to recurrently remove these jobs.

<Second Holding Method>

The hold content in a second holding method is a list of (1) job names, (2) job IDs, (3) job states, and (4) awaited job names.

In this second holding method, the fresh registration of jobs is carried out as follows.

(Step 1): Given job names, job IDs and job states are registered, and the list of awaited job names is emptied.
(Step 2): For respective job names (referred to as job names 1) in a given "list of waiting job names", the following operation is repeatedly carried out.
(Step 2.1): The database is searched by the job names (1).
(Step 2.2): If there are the jobs retrieved in the database, the names of the jobs to be freshly registered are added to the list of awaited job names.

When jobs are removed by designating the names of the jobs, this second holding method is performed as follows.

(Step 1): The database is searched by the job names.
(Step 2): The list of waiting job names is held.
(Step 3): The jobs retrieved in the database are removed.
(Step 4): An operation of recurrently removing the jobs thus retrieved is carried out for respective jobs that exist in the list of waiting job names held.

In case where the job submitting system 7 provides a method of informing the start and the end of a job, there is added an operation of inquiring the state of a job to the job submitting system 7 at regular intervals, setting the state of the job to be a "start" state when the job is started, and setting the state of the job to be a "completion or end" state when the job is completed or ended. This operation is continued during the operating period of the job control device, so that monitoring of jobs is always carried out.

The procedure for performing such an operation is as follows.

(Step 1): The following operation is carried out regularly (e.g., once per second, etc.).
(Step 1.1): The following operations are performed for all the jobs whose states are not "completed" (referred to as jobs A) among all the jobs in the database.

(Step 1.1.1): The job IDs of the jobs A are taken out.
(Step 1.1.2): The states of the jobs with the job IDs are inquired to the job submitting system 7.
(Step 1.1.3): If the jobs inquired has started to be executed, the states of the jobs A are set to be "start".
(Step 1.1.4) If, however, the jobs inquired have been completed, the states of the jobs A are set to be "completed".

Further, when the states of jobs in the job state database 2 have been changed according to the above method or by that means for writing into the database which is described as a job content, the job state database management part 3 notifies the job state handling part 6 of the changes by the names of jobs whose states have been changed. Here, note that to implement such a function, the writing means may notify the changes to the job state handling part 6, or the job state handling part 6 may monitor the database 2 or the job state database management part 3 by making an inquiry thereto at regular intervals, so that it can recognize only those portions of the database 2 which have been changed.

(The Job State Handling Part)

The job state handling part 6 includes a configuration file content storage part 6a for holding the contents (job names and the contents of jobs) of the configuration file F read by the configuration file reading part 1, and a waiting job data storage part 6b that comprises, if job names are represented by parameters (variables), a replacement list thereof and a list of "the names of waiting jobs" whose processing should be awaited. Then, information on those jobs whose states have been changed is acquired from the job state database 2. Here, this may be done as follows. That is, the job state database management part 3 monitors a change in the states of jobs in an operation subject or agent in the form of the job state database 2, so that when there takes place such a change in the job states, it can provide this information to the job state handling part 6.

In this case, when the state of any of the jobs has changed, the states of all the other jobs are examined or checked from the job state database 2, and nothing is done until the states of all the jobs become "completed". When the states of all the jobs are "completed", the termination of the operation of this job control device (software) is instructed.

Furthermore, in the case of using one or more names of jobs to be awaited or a pattern of the name of each job to be awaited or a program capable of writing variable representation, there is job state waiting data WD, as shown in FIGS. 4(A) through 4(E). This data is achieved by being integrated or associated with the configuration file content FD, as shown in these views.

The waiting list of the configuration file content is searched by the names of jobs which have been changed, and if the states of the jobs being awaited are all "completed", the processing of jobs waiting for these awaited jobs is performed. That is, the following procedure is performed.
(Step 1): The following processing is carried out for each item (hereinafter referred to waiting W) in the job waiting list of the control configuration file content.
(Step 1.1): If the job name of a job having been changed matches a waiting job name of the waiting W, that is, if any of the following cases is satisfied, the processing is done, whereas if otherwise, another waiting item of (Step 1) is processed.
(1) In the case of a software in which only one job name can be described, a job name having been changed matches that job name.
(2) In the case of a software in which a plurality of job names can be described, a job name having been changed matches any of them.
(3) In the case of a software in which one or more job name patterns can be described, a job name having been changed matches any of those patterns. Here, note that an example of such a pattern may include a wildcard (e.g., "*" matches an arbitrary number of characters, and "?" matches one arbitrary character), regular expressions, etc., of sh of UNIX.
(Step 1.2): The job name thus matched is added to the list of waiting job names of the waiting data related to the waiting W. If the same job name is included in duplicate in that list, all the same job names other than one may be removed.
(Step 1.3): It is checked whether the states of the respective job names in the list of job names of the waiting data (referred to as waiting jobs WJ) are all "completed". That is, the following operations are performed.
(Step 1.3.1): The states of the waiting jobs WJ are taken out of the job state database.
(Step 1.3.2): If the states of the waiting jobs WJ thus taken out are not "completed", this check is discontinued, and another waiting of (Step 1) is checked.
(Step 1.4): When all the states of the waiting jobs WJ are "completed", the execution content and the job name list of awaited jobs are passed to the execution-content executing part 4, which then executes prescribed processing as required.

At the termination of the job control device, it is determined whether the execution of the execution-content executing part 4 has been terminated. That is, when the state of any job has changed, the states of all the other jobs are examined or checked from the job state database 2. When the states of all the jobs are "completed", and when the execution of the execution-content executing part 4 has also been completed, an instruction for terminating the operation of the job control device (i.e., the operation of software) is issued.

Figure 5:
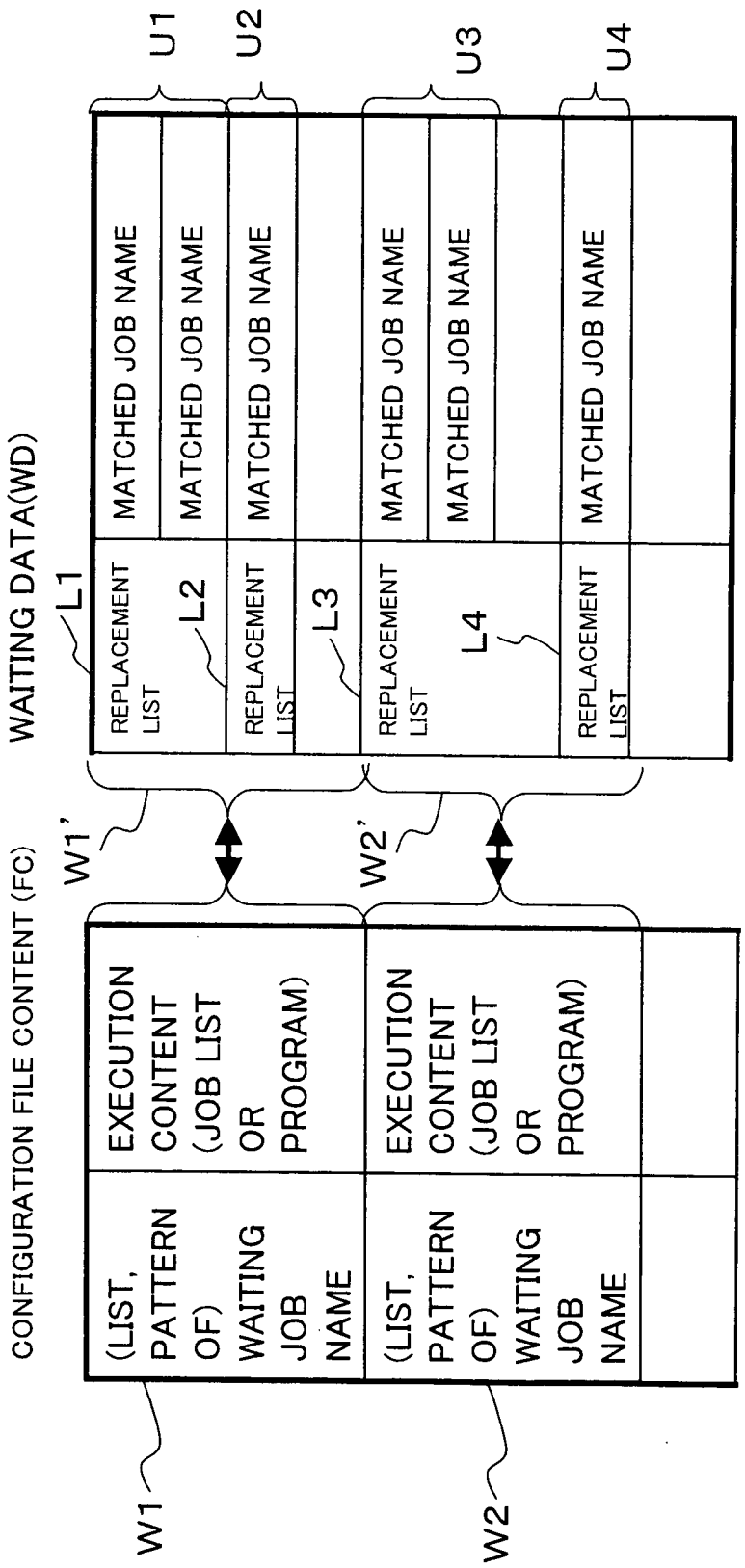
FIG. 5 is a view showing waiting data in case where variables can be described in waiting jobs.

Still further, when variables can be written as a part of the pattern of a job to be awaited, the content FC of the configuration file includes job state waiting data (WD), as shown in FIG. 5. The job state waiting data (WD) comprises waitings (W1', W2') related to corresponding jobs (waiting job names) (W1, W2), respectively, and processing unit lists U1 through U4 which can be designated by variable replacement lists L1 through L4. The job state waiting data (WD) is achieved in association or integration with the configuration file content, as shown in FIG. 5.

A search is made through the waiting lists in the configuration file content for the job names of jobs that have been changed, and if the states of the waiting jobs existing in the corresponding processing units are all "completed", the processing of jobs waiting for the waiting jobs is performed. That is, the following procedures are carried out.
(Step 1): The following processing is performed for each item (hereinafter referred to as waiting W) in the job waiting lists in the configuration file content.
(Step 1.1): In case where the job name of a job having been changed matches any of the waiting job patterns of waitings W, if variables are described in the matched pattern, a list comprising the variables and their corresponding values in pairs are taken out as a replacement list, whereas if there is no variable described in the matched pattern, a corresponding replacement list is empty. On the other hand, in case where there is no match therebetween, another waiting of (Step 1) is then processed.
(Step 1.2): If the processing units related to the waiting W have no corresponding processing unit comprising the same replacement list or lists, such processing units are freshly added.
(Step 1.3): In the processing units related to the waiting W, jobs that have been changed are added to the waiting job list of a processing unit comprising the same replacement list or lists (hereinafter referred to as a processing unit U). If there are the same job names repeatedly in that waiting job list, all the same job names other than one may be removed.

(Step 1.4): It is checked whether the states of the respective job names (hereinafter referred to as waiting jobs JW) in the waiting job list of the processing unit U are all "completed".

That is, the following operations are carried out.

(Step 1.4.1): The states of the waiting jobs JW in the job state database are taken out.

(Step 1.4.2): If the states of the waiting jobs JW thus taken out are not "completed", this check is discontinued, and another waiting of (Step 1) is checked.

(Step 1.5): If all the states of the waiting jobs JW are "completed", the execution content of the processing unit U, the job name list of the waiting jobs and the replacement list thereof are passed to the execution-content executing part 4.

(The Execution Content Executing Part)

The execution-content executing part 4 performs processing when the waiting of jobs is completed or when the job control device (software) is actuated. The execution-content executing part 4 receives an execution content, a replacement list (in case of using a replacement list) and a list of names of jobs being awaited, and performs processing of the execution content. If a program is not described as the execution content, the execution content is passed to the job submitting part 5 together with a list comprising the names of jobs to be submitted and their contents in pairs, accompanying the names of the jobs in the list and their contents, or a replacement list, if any, with the names of awaited jobs.

If a program is described as the execution content, the program is executed. Regarding programming languages used to describe the program, any arbitrary one may be selected if a processing system is provided which is able to execute character sequences as a program. For example, C program language can be used by using C language interpreter. Or, even script languages such as perl, tcl, etc., the shells of UNIX such as sh, csh, can be used. A method of instructing the submitting of jobs is provided even when which language is used. When the submitting of jobs is instructed, the names and contents of jobs that are wanted to be submitted are always described.

When the part where the submitting of jobs is instructed is executed, a replacement list as an option and a list of the names of jobs being awaited are passed along with the job names and the job contents described therein. Here, it is possible not only to merely pass the replacement list, but also to pass a list of the numbers of variables in the program in addition to the replacement list or instead of the optional replacement list.

(Operation)

Now, the operation of this embodiment will be described below. First of all, the configuration file and the job state database are designated when the job control device is actuated or booted. When actuated, the job control device operates as follows.

(First Operation: In the Case of any Job Input Condition Such as Job Waiting or the Like Being Unnecessary).

(Step 1): The designated configuration file is read in by the configuration file reading part 1, and stored into the configuration file content storage part 6*a*.

(Step 2): The execution content of the configuration file in the configuration file content storage part 6*a* is sent to the execution-content executing part 4.

(Step 3): The execution-content executing part 4 sends to the job submitting part 5 the job names and the job contents for the jobs to be submitted.

(Step 4): The job submitting part 5 submits necessary jobs alone to the job submitting system 7 by referring to the job state database 2.

(Step 5): Whenever the state of a job is changed, writing into the job state database 2 is performed by the job state database management part 3, and such a change is monitored by the job state handling part 6. In this connection, it is needless to say that the job state database management part 3 may notify the job state handling part 6 when such a change is generated.

(Step 6): The operations in (Step 5) are repeated until the job state handling part 6 instructs the termination of the operation of this job control device (software).

(Second Operation: In the Case of a Job Input Condition (e.g., Jobs Begin to be Performed While Waiting for the Completion of the Jobs to be Awaited) Being Present)

(Step 1): The designated configuration file is read in by the configuration file reading part 1, and stored into the configuration file content storage part 6*a*.

(Step 2): As a case where there is a special job name to represent the start time and/or the end or completion time of a job, a special job name "TOP" representing the start time of a job is provided for example. Here, note that this special name is not limited to this character string, but any other convenient character string can be arbitrarily chosen as required. Thus, when the job of concern is started, the state of the job termed "TOP" in the job state database is changed to "completed".

(Step 3): All the job names of jobs in their completed states, which are related to the job of concern and stored in the job state database 2, are sent to the job state handling part 6.

(Step 4): When the state of a job in the job state database 2 has been freshly changed, the job is sent to the job state handling part 6.

(Step 5): When the change in the state of the job is notified to the job handling part 6 (Step 3 and Step 4), the job handling part 6 passes the execution content to the execution-content executing part 4 at the time when all the states of the waiting jobs have been "completed".

(Step 6): When instructed to execute the execution content in (Step 5), the execution-content executing part 4 sends to the job submitting part 5 the job names and the job contents for the jobs to be submitted. The job submitting part 5 submits necessary jobs alone to the job submitting system 7 by referring to the job state database 2.

(Step 7): The operations in (Step 4 through Step 6) are repeated until the job state handling part 6 instructs the termination of the operation of this software.

(Step 8): As a case where there is a special job name to represent the start time and/or the end or completion time of a job, a special job name termed "END" representing the termination or end time of a job is provided for example. Here, note that this special name is not limited to this character string, but any other convenient character string can be arbitrarily chosen as required. Thus, the state of the job termed "END" in the job state database is changed to "completed", and the change in the state of the "END" job is notified to the job state handling part 6.

(Step 9): If the job state handling part 6 finds an execution content waiting for the END job, for which all the jobs have been completed, the execution content thus found is sent to the execution-content executing part 4.

(Step 10): When the execution-content executing part 4 completes the execution of the execution content, this software is finished or terminated.

(Third Operation: In the Case of Job Control Software Being Executed for the First Time)

The configuration file is read in, and the execution-content executing part executes the content of the configuration file, whereby the execution of a lot of jobs can be submitted from the single configuration file.

Accordingly, in this embodiment, the problem of easily submitting a large amount of jobs can be solved. In addition, repetition control such as "for" sentences, "while" sentences, etc., can be used, and the submitting of jobs can be done in these sentences. Therefore, according to this embodiment, it is possible to solve the problem of easily submitting a large amount of jobs merely by making a very short description in the configuration file. Moreover, the content to be executed as jobs can be described in the configuration file, so that when the jobs are submitted, the job submitting part can automatically generate a file necessary for submitting the jobs while taking this content as a model. Accordingly, it is possible to solve the problem of submitting a lot of jobs from a single file.

Further, even in cases where the job submitting mechanism does not issue information on the start and/or the end or completion of the execution of a job, it is possible to solve the problem of grasping the state of the start and/or the end of the job. Also, it is possible to solve the problem of easily determining whether all the jobs that are submitted by using this embodiment have been completed, so that the job state handling part waits for the completions of all the jobs. Furthermore, by combining with a configuration that can describe a content executed without fail upon completion, and that can further describe job names in a program, it is possible to describe the processing to be carried out without fail upon completion. For example, processing such as writing a specific value in a specific file, sending an e-mail to a specific address or the like can be done. Accordingly, it is possible to solve the problem of instructing a suitable operation when all the jobs that have been submitted by using this embodiment are completed.

Moreover, the job state handling part 6 waits for the completions of some jobs, and thereafter the execution-content executing part 4 submits jobs. Accordingly, it is possible to solve the problem that there is a dependency between jobs, some of which are submitted while waiting for the completions of the other jobs. Also, it is possible to describe a program which is executed when all the jobs to be awaited have been completed. In general, a program is able to describe determination, repetition, calls of subprograms, etc. As a result, it is possible to perform complicated work such as, for example, taking out of the results of jobs, the submitting of jobs based on the results of other jobs, processing through repetition of results of an indefinite number of jobs. Accordingly, it is possible to solve the problem of processing jobs while waiting for an indefinite number of other jobs or submitting jobs based on the results of other jobs.

Further, variables can be described in the patterns of jobs to be awaited when others are waiting for the completions of the jobs, and the job state handling part provides a processing unit for the number of each variable, so that jobs can be submitted for the number of each variable. That is, a single waiting description has the same effect as a plurality of waiting descriptions. Thus, it is possible to solve the problem of handling a plurality of waitings of similar jobs by a single description without needing a plurality of waiting descriptions.

(Fourth Operation: In the Case of the Job Control Software Being Reexecuted After it has Terminated Abnormally During Execution Thereof)

When the operation of this job control device terminates abnormally due to an unexpected accident such as machine failure, etc., the processing to be performed while waiting for jobs controlled by the job control device cannot be done as it is. However, since the states of jobs having been executed are preserved or saved in the job state database 2, it is unnecessary to resubmit the jobs having once been submitted when this job control device is reactuated or reexecuted after such an abnormal termination or after a normal termination. Furthermore, since all the jobs existing in the job state database 2 are first sent to the job state handling part 6, all the pieces of waiting data (i.e., data to be awaited) are reconstructed in the same states as their previous states at the instant when the device terminated abnormally. Therefore, the job control device can be reexecuted any number of times after abnormal termination or normal termination, so it is possible to solve the problem of performing completion or termination processing while continuing waiting jobs.

(Fifth Operation: In the Case of the Job Control Device Being Reexecuted After Certain Jobs in the Job State Database have been Removed)

In this job control device, when the device is reexecuted after certain jobs have been removed from the job state database, those jobs which have not been removed can be found by referring to the job state database, and hence need not be again submitted thereto, but the removed jobs alone can not be found from the job state database, and have to be submitted again. That is, only the removed jobs can be executed again. In the above-mentioned operations, the user has only to remove jobs to be redo by designating their job names, but need not edit any file. As a consequence, it is possible to solve the problem that the user wants to reexecute only a part of jobs without editing any file.

Particularly, when jobs are removed, all the jobs that have the mutual waiting relation with respect to one another, such as waiting jobs that are executed while waiting for some of the removed jobs, other jobs that are executed while further waiting for the waiting jobs, etc., are removed in an automatic fashion in consideration of the job waiting relation. Thus, it is possible to solve the problem that the user wants to reexecute only a part of jobs and their related jobs without editing any file.

Embodiment 2

In contrast to the above-mentioned first embodiment in which the job submitting part is incorporated in the job control device, a second embodiment of the present invention describes an example of a job control device using a job submitting part which is provided to another processing system. Here, note that the construction of this second embodiment other than the job submitting part includes all the same components as those of the first embodiment, and a concrete example of submitting jobs will be explained below in combination with these components.

Figure 6:
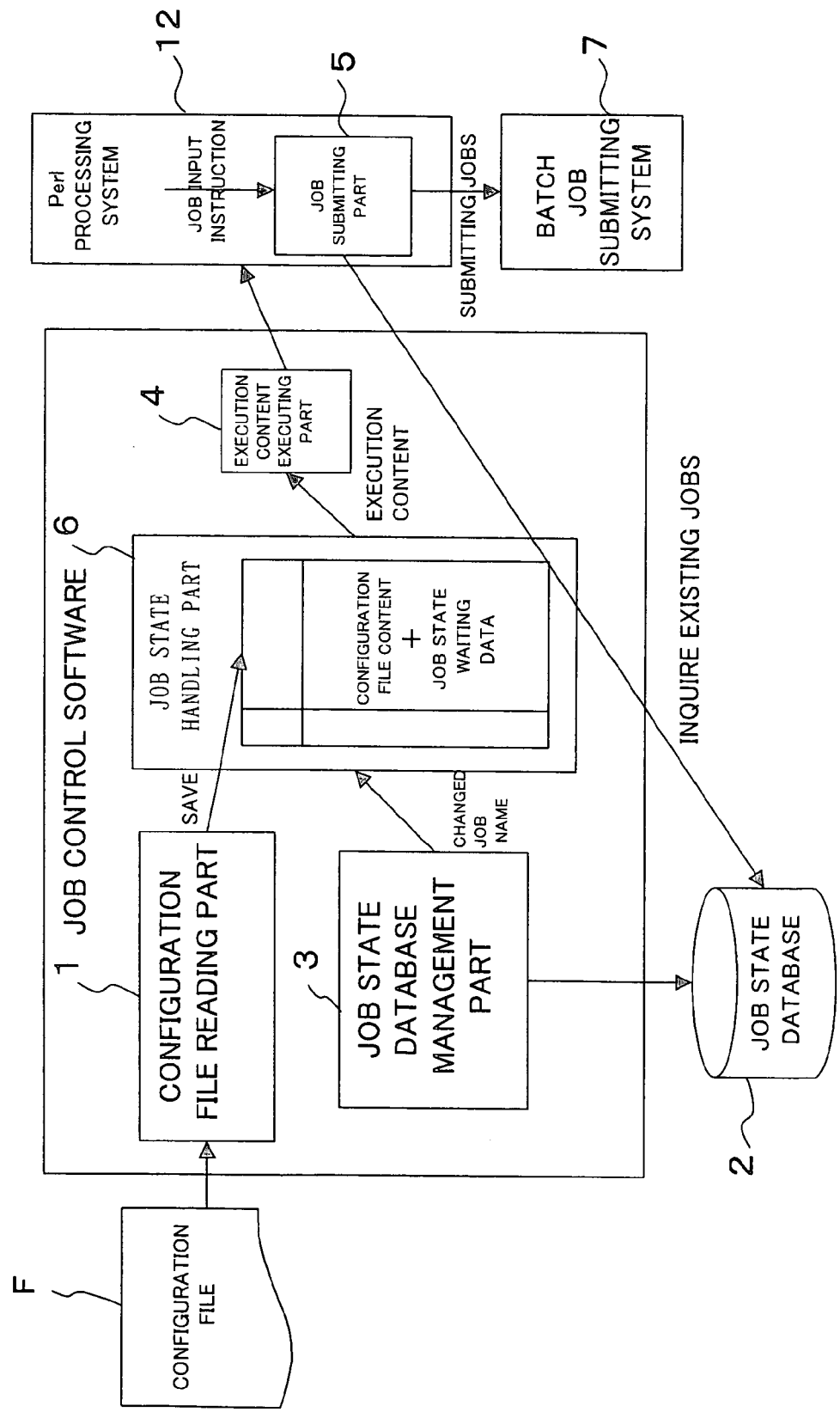
FIG. 6 is a block diagram showing a job control device according to a second embodiment of the present invention.
Figure 10:
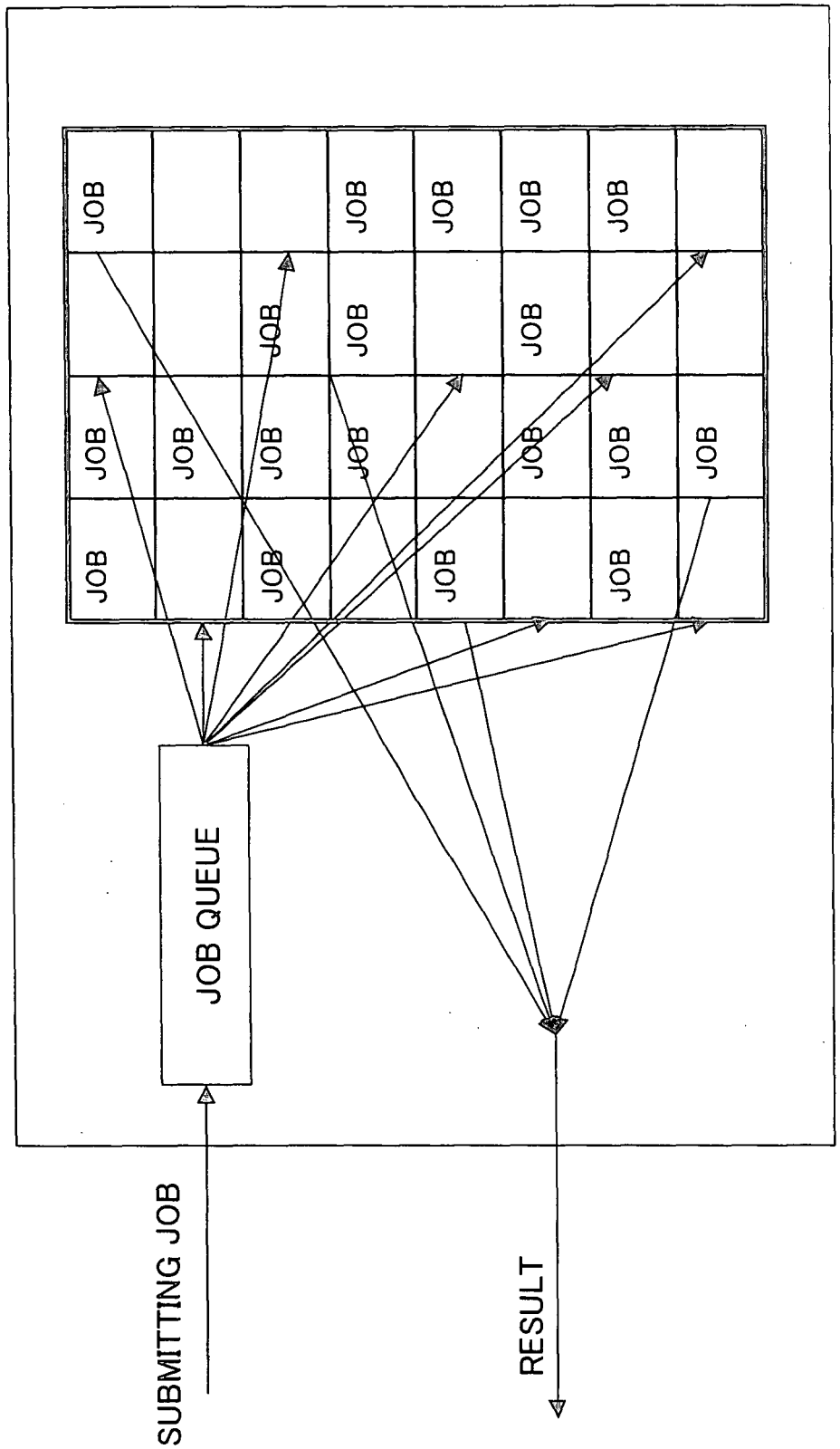
FIG. 10 is a conceptual diagram showing a known batch job submitting system.

FIG. 6 is a block diagram that shows the construction of the second embodiment. In the second embodiment, it is assumed that a Perl processing system 12*a* is provided with a job submitting part 5A, and that the execution content of waiting can be described in a perl program. In this second embodiment, a waiting execution part is called a local script. The execution content of jobs can be described in a perl program. In this chapter, the execution content of jobs is called a job script. The configuration file has a syntax as shown in FIG. 7.

The perl language can be arbitrarily used for a local script, and in particular, a job submitting designation part in the local script has a syntax as shown in FIG. 8.

An arbitrary perl program can be described in the job script. A job name has a syntax as shown in FIG. 9. When the identity of job names is checked, the order of keys appearing is of no significance. It is assumed that upon checking the identity of job names, two job names are identical if they have all the same keys and if all the values of the keys of one job name coincide with the values of corresponding keys of the other job name, respectively.

In case of the patterns of the job names, a pattern element can be described in the part of a value.

The following symbols can be used as pattern elements.
(1)*: This matches a character string comprising an arbitrary number of characters.
(2) ?: This matches one arbitrary character.
(3) $variable: This matches one or more characters, and the values of perl variables of that name are replaced with a character string matched.

The configuration file reading part 1 reads in the above-mentioned configuration file. Upon reading, a local script part is held or retained as a character string, but a job submitting designation part "do_job" is held as a structure comprising a job name and a job script. The job state database 2 is put in a directory designated by the user, and the states of jobs are written into files whose file names comprise job names. A change in a job state is written directly into a corresponding file. The job state database management part 3 monitors these files at regular intervals (e.g., once per second), and if an update time in a file becomes newer, it is determined that a change has been made in the file in question, and the job state handling part 6 is notified to that effect.

The execution-content executing part 4 first boots the perl processing system as a separate process, whereby the perl processing system executes or evals the lines read from a standard submitting, respectively. Upon receipt of the local script, the execution-content executing part 4 writes the content of the local script into a temporary file (referred to as a first temporary file F1).

A content of replacement is implemented by a list comprising pairs of variable names and their values, and when the content of replacement is passed to the execution-content executing part 4, it is written into the head of the temporary file so as to change the numbers of corresponding perl variables to the content. Dependent job names are written into another temporary file (referred to as a second temporary file F2), and the file name thereof is written into the first temporary file F1 containing the local script in the form of a change in the number of a special global variable.

If there is a do_job for job submitting instruction, the job script part is written into still another temporary file (referred to as a third temporary file F3), and the call of a special perl subprogram is added to the first temporary file F1 containing the local script. Upon calling the special perl subprogram, the job names making reference to the variables are replaced in an appropriate manner by using the variable replacement function of perl.

Then, the local script is executed by sending a character string of "do temporary file F1" toward the standard submitting of the perl process. The job submitting part 5A is implemented in the form of a perl subprogram which can be called from the local script. This subprogram submits jobs by referring to the job state database. The third temporary file F3 is rewritten before the submitting of the jobs is carried out. Since it is convenient to be able to use environment variables at the submitting of the jobs when the job script is executed, the values of the environment variables at the job submitting is first written into the third temporary file F3.

The job state handling part 6 performs the same operation as that of the first embodiment in the case where variables can be described as part of a pattern of each of the jobs to be awaited. The content of the configuration file and the waiting data are integrated to provide the configuration as shown in FIG. 5.

Matching between a job name and a job pattern is carried out as follows.
(Step 1): If there is a key that exists only in either one of the job name and the job pattern, there is no matching therebetween.
(Step 2): Pattern matching is performed between the values of all the keys in the job name and the individual pattern elements of the same keys in the job pattern. A method of matching between the values and the pattern elements will be described later. If this pattern matching fails, there is no matching between the job name and the job pattern.
(Step 3): Lists of the variables and values obtained by all the pattern matchings are merged, and if any of the variables appears two or more times and if the values for that variable appearing two or more times are different from one another, the matching between the job name and the job pattern results in failure.
(Step 4): If not any of the above cases, pattern matching is successful, and a merged list of the variables and values is returned as a replacement list.

The procedure of matching between the values (character string) and pattern elements is as follows.
(Step 1): The pattern elements are converted into regular expressions as exemplified below.
(1) *→.*
(2) ?→.
(3) $variable→(.+)
(4) Special meaning characters such as ".", etc., are escaped by ¥.

If there are variables in the pattern, the order of the variables appearing and the names of the variables are recorded in pairs.
(Step 2): The job names are pattern-matched with regular expressions. Since this pattern matching method is widely known, no detailed explanation thereof is made here. If the pattern matching with the regular expressions fails, this procedure also returns failure and ends.
(Step 3): A list comprising pairs of variable names and values is prepared from pairs of the variable names and their order of appearing obtained by (Step 1) and data for backward reference obtained as a result of the pattern matching. Then, success is returned, and the processing ends.

For example, when a character string "abcde.fg_hij" and a pattern "$a.$b_*" are matched with each other, the pattern is first converted into regular expressions "^(.+)¥.(.+)_.*$", and at the same time, a list of variable "a": 1 and variable "b": 2 is prepared. Then, the regular expressions and the character string are matched with each other, and the data for backward reference comprising the first: "abcde" and the second: "fg" is obtained. Finally, a replacement list of variable "a": "abcde" and variable "b": "fg" is prepared, and success is returned.

Embodiment 3

The description language for the local script and the job script in the second embodiment can be easily changed from perl to sh. In this case, what is to be changed is only the content that is written into the temporary file F1 by the execution-content executing part, and the content that is written into the temporary file F3 by the job submitting part, and is to boot sh instead of the perl processing system.

The changed portion of the content written into the temporary file F1 by the execution-content executing part is that in the second embodiment, the job submitting instruction is converted into the perl subprogram, but in this third embodiment, it is necessary to convert the job submitting instruction to another command that can be executed from sh. In addition, the content written into the temporary file F3 by the job submitting part is merely changed such that the method of writing the environment variables is different between perl and sh. The third embodiment is able to operate in quite the same manner as in the second embodiment without any change other than the above.

Although a few preferred embodiments of the present invention have been described above, the present invention is not limited to these embodiments but can of course be changed or modified in any manner without departing from the spirit and scope of the invention as defined in the appended claims. For example, the condition determination in the present invention is made by the job submitting part in the above-mentioned preferred embodiments, but it may be made by the job state database management part or by the job state handling part.

As described in detail in the foregoing, according to the present invention, it is possible to reduce the time and trouble of user's management when batch jobs are submitted. In addition, scripts and/or control files necessary for submitting jobs can be automatically prepared, and the time required for executing the jobs can be reduced by preventing duplicate jobs from being submitted. Moreover, according to the present invention, only part of jobs can be selectively reexecuted by making a setting in a manner as if they had not yet been executed, without changing control files.

While the invention has been described in terms of preferred embodiments, those skilled in the art will recognize that the invention can be practiced with modifications within the spirit and scope of the appended claims.

What is claimed is:

1. A job control device comprising:
 a computer readable storage to store a configuration file that stores a job designation description designating, by name, a job to be submitted and a job submitting condition of the job;
 a job designation description reading unit that reads, from the configuration file, a job designation description and a job submitting condition of a second job to be submitted, the job submitting condition of the second job specifying using job names from the configuration file that execution of the second job depends on completion of one or more first jobs;
 a job management unit that registers jobs in a job state database, monitors execution states, including a state of executing and a state of completed, of the jobs in the job state database when the jobs are executed, and repeatedly stores execution states of the jobs in the job state database at a predetermined interval; and
 a processing execution unit that refers to the job state database, and submits the second job when according to a job submitting condition of the second job specifying that execution of the second job depends on completion of one or more first jobs, as designated by names of the one or more first jobs in the job state database, are completed according to the execution states of the one or more first jobs in the job state database,
 wherein a job is designatable in the job designation description by using a parameter, including a designating of a job on basis of a pattern in job names, as a parameter for pattern matching, including a variable for the pattern matching, and submission of the second job includes preparation of a replacement list which represents the second job by the parameter, including represents the second job by a value of the variable in a matched pattern, for submission of the second job, and
 wherein the designating of the jobs to be submitted is in form of a model and the processing execution unit submits the second job according to the model.

2. The job control device according to claim 1, wherein the processing execution unit creates a job script file according to the form so as to submit the second job according to the job script file.

3. The job control device according to claim 2, wherein the processing execution unit adds a command for writing information on a start or an end of execution of the second job to the job script file.

4. The job control device according to claim 1, wherein the job designation description includes a description that designates one of the first jobs which indicates a start or end of each of the second job.

5. The job control device according to claim 1, wherein the job management unit manages the submitting, start, and completion of the first jobs and the second job by referring to the states of the first jobs and the second job stored in a database.

6. The job control device according to claim 5, wherein the job management unit is able to rewrite or delete a state of the second job stored in the state database, and the processing execution unit reads the configuration file again for the deleted second job, and determines whether or not a job submitting condition that is designated by a job designation description of the configuration file which is read again by the configuration file reading unit, is satisfied.

7. The job control device according to claim 1, wherein the job designation description, job IDs of the first jobs and the second job, and the states of the first jobs and the second job are stored in the job state database, and the job management unit registers new jobs, retrieves jobs, removes jobs, and changes the states of jobs.

8. The job control device according to claim 1, wherein the job management unit stores a list of the first jobs in the state database by using the job designation description.

9. The job control device according to claim 8, wherein if the second job is determined not to be completed by the job management unit, the configuration file reading unit reads the configuration file again and the processing execution unit determines whether or not a job submitting condition that is designated by a job designation description of the configuration file which is read again by the configuration file reading unit, is satisfied.

10. The job control device according to claim 1, wherein the job management unit stores the second job in the state database by using the job designation description.

11. The job control device according to claim 1, wherein when the first jobs are removed from the state database, the job management unit removes the second job from the state database.

12. A job control method applied in a job control device that includes a job state database and a configuration file that stores a job designation description designating, by name, a job to be submitted and a job submitting condition of the job, the job control method comprising:

configuring the job control device to execute:
- reading from the configuration file a job designation description and a job submitting condition of a second job to be submitted, the job submitting condition of the second job specifying using job names from the configuration file that execution of the second job depends on completion of one or more first jobs;
- registering jobs in the job state database, monitoring states, including a state of executing and a state of completed, of the jobs in the job state database when the jobs are executed, and repeatedly storing execution states of the jobs in the job state database at a predetermined interval; and
- referring to the job state database, and submitting the second job when according to a job submitting condition of the second job specifying that execution of the second job depends on completion of one or more first jobs, as designated by names of the one or more first jobs in the job state database, are completed according to the execution states of the one or more first jobs in the job state database,
- wherein a job is designatable in the job designation description by using a parameter, including a designating of a job on basis of a pattern in job names, as a parameter for pattern matching, including a variable for the pattern matching, and the submitting of the second job includes preparing a replacement list which represents the second job by the parameter, including represents the second job by a value of the variable in a matched pattern, for submission of the second job, and
- wherein the designating of the jobs to be submitted is in form of a model and the processing execution unit submits the second job according to the model.

* * * * *